(12) United States Patent
Kawai

(10) Patent No.: US 6,799,872 B2
(45) Date of Patent: Oct. 5, 2004

(54) HEADLIGHT FOR MOTORCYCLE

(75) Inventor: Hidenari Kawai, Iwata (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 10/326,529

(22) Filed: Dec. 19, 2002

(65) Prior Publication Data

US 2003/0142502 A1 Jul. 31, 2003

(30) Foreign Application Priority Data

Dec. 19, 2001 (JP) .................................... 2001-386022

(51) Int. Cl.[7] ................................................ B62J 6/00
(52) U.S. Cl. ..................................... 362/473; 362/475
(58) Field of Search ........................... 362/473, 475, 362/476, 487, 506, 507, 538, 268, 543

(56) References Cited

U.S. PATENT DOCUMENTS 1,473,307 A * 11/1923 McGrath ................. 362/506
5,042,870 A    8/1991  Yura
5,055,981 A   10/1991  Nino
5,409,287 A    4/1995  Suzuki
5,647,664 A    7/1997  Hanecka
6,109,772 A    8/2000  Futami et al.
6,203,093 B1   3/2001  Suzuki et al.
6,520,659 B2 * 2/2003  Nishiyama et al. ......... 362/507

* cited by examiner

Primary Examiner—Y My Quach Lee
(74) Attorney, Agent, or Firm—Knobbe Martens Olson & Bear LLP (57) ABSTRACT

A headlight for a motorcycle illuminates the space in front of the motorcycle, through which a longitudinally-extending, vertical central plane passes. The motorcycle headlight comprises a light source and a plurality of lenses having centers and arranged to receive light from the light source. The light source is disposed outwardly from the center plane of the motorcycle with respect to the centroid of the centers.

20 Claims, 7 Drawing Sheets

HEADLIGHT FOR MOTORCYCLE

RELATED APPLICATION

The present application is based on and claims priority under 35 U.S.C. §119 to Japanese Patent Application No. 2001-386022 filed Dec. 19, 2001, the disclosure of which is hereby incorporated by reference in its entirety.

BACKGROUND OF THE INVENTION

1. Field of the Invention

The present invention relates to a headlight and, more particularly, to a headlight for motorcycle or similar vehicle.

2. Description of the Related Art

Space, weight, and aerodynamic considerations affect the design of motorcycles and their subsystems. For instance, the headlight may be shaped so as to simultaneously meet aerodynamic constraints and packaging requirements. Projector headlights have developed as a means of providing a large amount of light while reducing size and weight. The projector headlight commonly includes a reflector and a bulb (light source) at the rear of the lamp body and a lens at the front, such that light is converged by the lens. For automotive vehicles, projector headlight efficiency has been further increased by providing a plurality of lenses.

In the case of motorcycles and similar such vehicles, headlights may be disposed in front of the vehicle to either side of the front fork. Because of space and aerodynamic considerations, it is desirable that the headlight be near the centerline of the vehicle and as far rearward as possible. Generally, it is the front fork that constrains the placement of the headlight to the most favorable location. In particular, the position of the bulb within the headlight may affect how close the headlight may ultimately be disposed to the front fork, since the hardware supporting the bulb is generally the most rearward portion of the headlight body.

SUMMARY OF THE INVENTION

The use of headlights having multiple lenses for a single bulb offer an opportunity for producing a headlight wherein the bulb is favorably disposed relative to the fork of a motorcycle. In addition, the multiple lens elements may be disposed so as to produce for a favorable aerodynamic form along the front face of the headlight.

An aspect of the present invention comprises a headlight for a motorcycle having a fork and a vertical center plane extending along the length of the motorcycle. The headlight comprises a light source and a plurality of lenses. The lenses have centers and are arranged to receive light from the light source. The light source is adapted to be disposed farther outwardly from the center plane than a centroid of the centers of the lenses.

Another aspect of the present invention involves a headlight system for a motorcycle, which has a fork and a vertical center plane that extends along the length of the motorcycle. The headlight system comprises first and second headlights. The first headlight is disposed laterally on one side of the center plane and the second headlight is disposed laterally on the opposite side of the center plane. The first headlight has a first light source and a first plurality of lenses having centers. The lenses are arranged to receive light from the first light source. The second headlight has a second light source and a second plurality of lenses. The lenses have centers and are arranged to receive light from the second light source. The first light source is disposed outwardly from a centroid of the centers of the first plurality of lenses and the second light source is disposed outwardly from the centroid of the centers of the second plurality of lenses.

In accordance with an additional aspect of the present invention, a headlight for a motorcycle is provided. The motorcycle has a fork and a vertical center plane that extends along the length of the motorcycle. The headlight comprises a light source and a plurality of lenses. The lenses have centers and are arranged to receive light from the light source. The centers are also disposed substantially along a vertical line and the light source is disposed vertically above a centroid of the centers.

Another aspect of the present invention involves a motorcycle comprising a frame that is generally bisected by a vertical, longitudinally extending central plane. A front fork is rotatably coupled to the frame so as to rotate about a steering axis through an envelop of rotational positions. At least one headlight is coupled to the frame and is disposed outside the envelop of rotation positions of the front fork so as not to interfere with rotation of the front fork. The headlight includes a light source and a plurality of lenses arranged to receive light from the light source. Each lens has a center that is spaced from the center of the another lens, and a centroid is defined at the midpoint between the centers of two adjacent lenses. The light source is disposed farther outwardly from the center plane than the centroid.

BRIEF DESCRIPTION OF THE DRAWINGS

The foregoing features, aspects, and advantages of the present invention will now be described with reference to the drawings of preferred embodiments that are intended to illustrate and not to limit the invention. The drawings comprise seven figures.

DETAILED DESCRIPTION OF THE PREFERRED EMBODIMENTS

Figure 1:
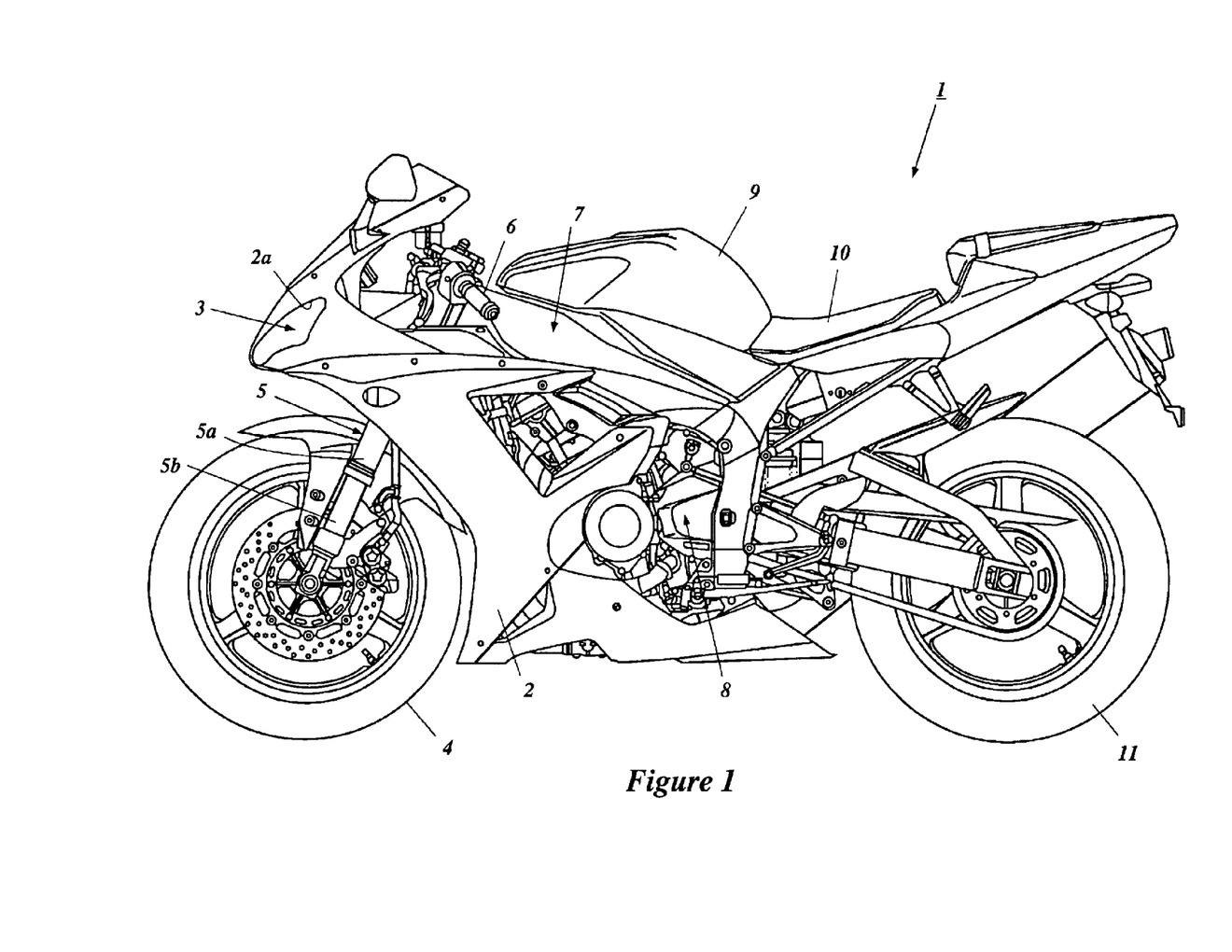
FIG. 1 is a left-side view of a motorcycle to which a preferred embodiment of the headlight is applied.

FIGS. 1 to 5 illustrate a motorcycle comprising a headlight consistent with a preferred embodiment. FIG. 1 is a side view of a motorcycle 1 comprising a cowling 2 and a headlight 3 disposed behind the cowling 2. The motorcycle 1 further comprises a front wheel 4, a front fork 5, a steering handle 6, a vehicle body 7, an engine 8, a fuel tank 9, a seat 10, and a rear wheel 11. In the following description, the terms "front," "rear," "left," and "right" are used to describe the motorcycle 1 and its various components as viewed by a rider seated in a normal riding position.

The front fork 5 is preferably a telescopic type having a pair of left and right outer tubes 5a and a pair of left and right inner tubes 5b inserted into the outer tubes 5a from the lower end thereof. As shown in FIG. 4, the outer tubes 5a are connected by an upper bracket 12 and an lower bracket 13. A head pipe 14 rotatably couples the outer tubes 5a and the brackets 12, 13 to a steering shaft 15. The front fork 5 has a caster angle wherein the fork 5 is inclined such that the top portion thereof is rearward of the bottom portion. When the fork 5 rotates, the outer tubes 5a rotate through an envelop of rotational position, which is schematically illustrated in FIG. 3 by envelope or path R.

Figure 3:
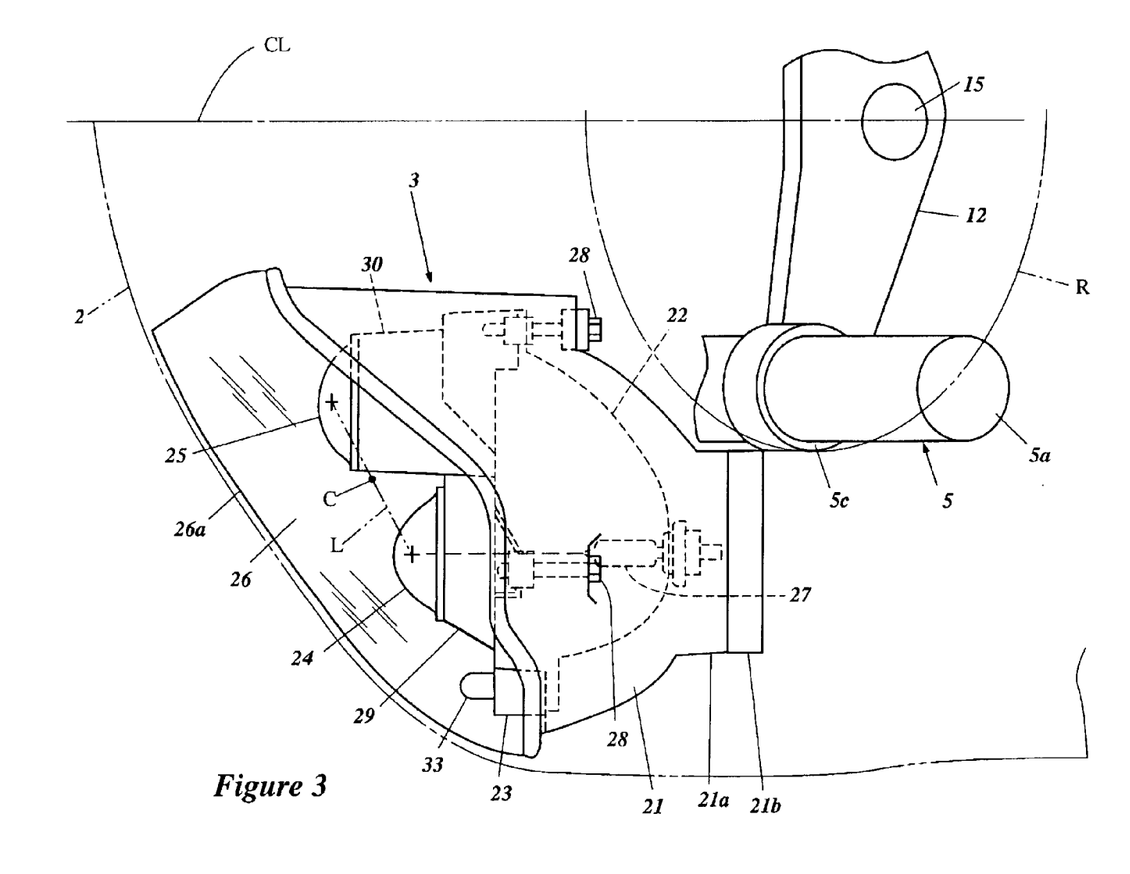
FIG. 3 is a top view of the headlight shown in FIG. 1 illustrating the track of the motorcycle fork when it rotates about the steering shaft.
Figure 4:
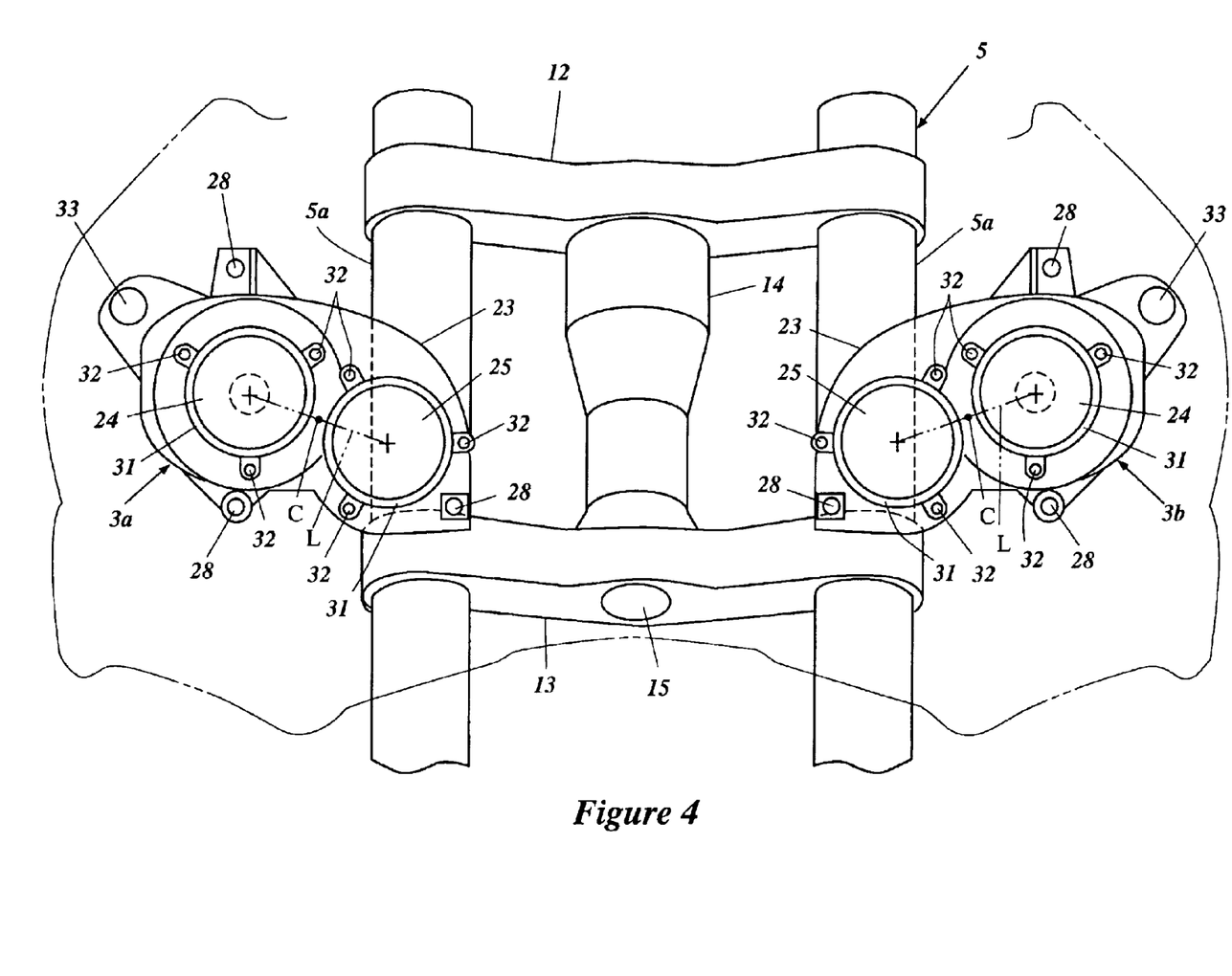
FIG. 4 is a front view of the headlight shown in FIG. 1 illustrating a preferred embodiment wherein two headlights are laterally disposed to either side of the fork.

For purposes of clarification, and as illustrated in FIG. 3, a center plane CL is disposed longitudinally along the vehicle body 7 and intersects the top of the steering shaft 15 through the center thereof. In the following description, the term "inward" refers to positions closer to the center plane CL and the term "outward" refers to positions farther from the center plane CL.

As best seen in FIG. 3, the headlight 3 for the motorcycle 1 comprises a light source 27 and a plurality of lenses 24, 25 having centers and arranged to receive light from the light source 27. The light source 27 is disposed outwardly from the center plane CL with respect to the centroid C of the centers. As illustrated in FIG. 3, the centroid C is located in the center of a line L having endpoints substantially located at the centers of the lenses 24, 25.

The headlight 3 can be utilized as part of a headlight system. As schematically illustrated in FIG. 4, the headlight system includes a first headlight 3a and a second headlight 3b. The first headlight 3a has a first light source 27 and a first plurality of lenses 24, 25 having centers. The lenses are arranged to receive light from the first light source 27. The second headlight has a second light source 27 and a second plurality of lenses 24, 25 having centers. The second lenses are arranged to receive light from the second light source 27. The first light source 27 is disposed outwardly from the centroid C of the centers of the first plurality of lenses 24, 25 and the second light source 27 is disposed outwardly from the centroid C of the centers of the second plurality of lenses 24, 25.

The pair of headlights 3a, 3b preferably are disposed in the front portion of the motorcycle 1 near the fork 5 so as to provide illumination in front of the motorcycle 1. Consistent with a compact system design, the headlights 3a, 3b are preferably disposed inward towards the center plane CL in front of the fork 5 and outward from the center plane CL on the side of the fork 5 so as to avoid interfering with the fork 5 when the fork 5 is rotated. Consistent with a favorable aerodynamic design of the cowling 2, the front face of each headlight 3 preferably slopes in a rearward direction when moving outwardly from the center plane CL and when moving upwardly from the bottom of the motorcycle 1.

In the illustrated embodiment, the headlight 3 preferably is a projector type headlight, which includes a lamp body 21 having a forward facing opening, a reflector 22, a lens holder 23, the lenses 24, 25, a lens cover 26, a light source 27, and a side marker lamp 33. The lens holder 23 supports the two lenses 24, 25 and is disposed within the lamp body 21. The lens cover 26 comprises a transparent material and serves to close the front opening of the lamp body 21. The headlight 3 is preferably supported by mounting the lamp body 21 to the head pipe 14 of the vehicle body frame 7 via a stay (not shown).

The lamp body 21 is generally tapered from front to back so that it is wider towards the front than the rear. The rear of the lamp body 21 comprises a rearward projection 21a, wherein mounting hardware for the light source 27 is accommodated. The projection 21a is covered at the rear by a detachable cap 21b that provides access to the light source 27. The rearwardly projection 21a has a generally cylindrical shape and the bulb 27 is positioned substantially at the center thereof when viewed from the front. Preferably, light source 27 includes a bulb having a filament or electric discharge; however, other types of light sources suitable for providing illumination are consistent with embodiments of the present headlight. The bulb may be held on the reflector 22 by a bulb holder not shown in the figures.

The reflector 22 is generally disposed forward of the vehicle body 7 within the lamp body 21 and is tapered from front to back. The inner surface of the reflector 22 is reflective and is formed so that light from light source 27 is reflect toward the lenses 24, 25. The reflector 22 is attached to the lamp body 21 by three aiming adjusting bolts 28 and by a lens holder 23 mounted on the opening.

Typically, a reflector for a headlight has reflective surface that is symmetric about a light source disposed in the center thereof. Frequently, the reflective surface has a generally spherical or parabolic shape, although not necessarily circularly symmetric about the center. In contrast, the present reflector 22 is formed to direct from a light source that is not centrally located therein. Thus, the light source 27 may be favorably located to one side of headlight center as defined by the centroid C. In certain embodiments, the inner surface of the reflector 22 is formed such that a first portion of light from the light source 27 comprises light reflected by at least a portion of the reflector 22. Light in the first portion is directed toward a first lens 24 of the plurality of lenses 24, 25. At least one other portion of light from the light source 27 comprises light reflected by at least a portion of the reflector 22. Light in the second portion is directed toward another lens 25 of the plurality of lenses.

Figure 5:
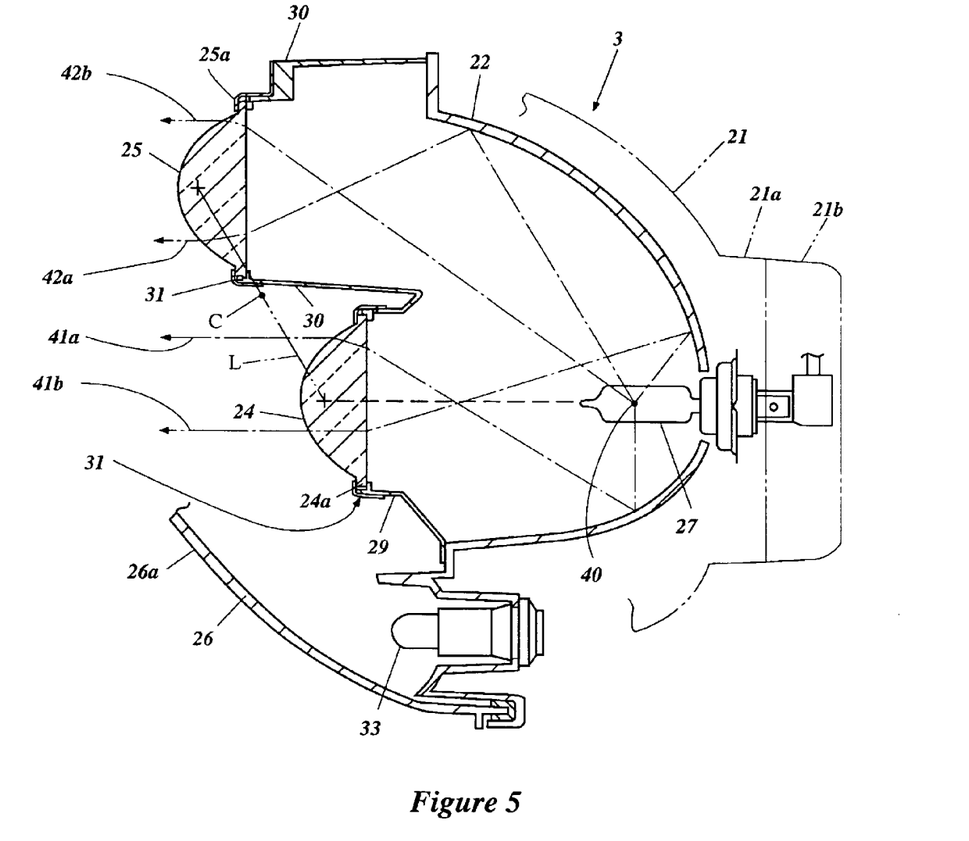
FIG. 5 is a top view of the headlight shown in FIG. 1 illustrating the shape of the reflector used to reflect light from the light source of the headlight and towards two lenses.

With reference to FIG. 5, some of the light in the first portion of light may be represented by light emanating from a point 40 on the bulb 27 and contained in the ray 41a and the ray 41b. Some of the light in the second portion of light may be represented by light emanating from the point 40 on the bulb 27 and contained in the ray 42a and the ray 42b. As seen in the case of the ray 42b, some of the light in either portion may comprise light directly from the bulb 27 that is not reflected off of the surface of the reflector 22. In like fashion, light from the remaining points on the bulb 27 are directed towards each of the lenses 24, 25. The lenses 24, 25 generally direct the light contained in each portion in a more forward direction. Preferably, the surface of the reflector 22 is disposed to affect the relative amount of light in the portions directed to lenses 24, 25. The bulb 27 as shown in FIG. 5 is directly behind the outer lens 24, when viewed from the front. However, in other embodiments, the surface of the reflector 22 is formed to efficiently direct light to the lenses 24, 25 when the bulb 27 is disposed in a more outward position (i.e., such that the optical axis of the outer lens 24 is between the center plane CL and the light source 27).

In certain embodiments, the lenses 24, 25 are of a planoconvex type that generally focus light directly from light source 27 or reflected off of the reflector 22. Other lens types, however, may also be used such as bi-convex or Fresnel type lenses. The lenses 24, 25 may also comprise other types of optical elements such as diffractive optical elements or gratings they may be used to provide a desired distribution of light in front of the motorcycle 1. Preferably the lenses 24, 25 additionally comprise flanges 24a, 25a, respectively, around the peripheries thereof that are used for mounting.

In certain embodiments, as shown in FIG. 3, the lens holder 23 is mounted on the front cover of the headlight that closes the reflector 22. The lens holder 23 includes two cylindrical lens mounting seats 29, 30 that are arranged such the lenses are positioned outward from the center plane CL and are oriented to projected light forwardly of the vehicle body 7. Preferably, the lenses 24, 25 are mounted at the front ends of the lens mounting seats 29, 30. To secure the lenses 24, 25 to the lens mounting seats 29, 30, the flanges 24a, 25a are clamped using mounting holder plates 31 and securing bolts 32 (see FIG. 4).

The lens cover 26 covers the two lenses 24, 25 from the front to form a front face 26a of the headlight 3. The front face 26a of the lens cover 26 generally conforms to the taper of cowling 2. Specifically, the front surface 26a slopes generally rearward when moving along the surface in a direction away from the center plane CL. The cowling 2 has an opening 2a (see FIG. 1) that is generally shaped like the front face 26a of the lens cover 26. The headlight 3 is disposed such that the outer surface of the cowling 2 and the front face 26a of the lens cover 26 form a generally smooth and continuous surface profile.

In the illustrated embodiment, as seen in FIG. 3, the fork 5 has a plurality of rotational positions defining an envelope and the headlight 3 is disposed outside the envelope. The path R in FIG. 3 represents a portion of this envelope in a horizontal plane passing through the headlight 3. Thus, the path R is the locus of outermost points of the fork 5 produced during rotation about the steering shaft 15. In such embodiments, the headlight 3 is constructed so as to be disposed relatively close to the center plane CL and the fork 5, yet not so close as to impede the rotation of the fork 5.

In certain embodiments, the lenses 24, 25 comprise an inner lens 25 disposed closer to the center plane CL and an outer lens 24 disposed farther from the center plane CL. In certain embodiments, the outer lens 24 is disposed rearward of the inner lens 25. In such embodiments, the inner lens mounting seat 30 projects farther forward than the other lens mounting seat 29. Since the lens holder 23 is formed in a manner described above, the front portion of the lens body 21 (i.e., the cover) sweeps backwards and outwardly as shown in FIG. 3.

In certain embodiments, the outer lens 24 has an optical axis substantially parallel to the center plane CL and the light source 27 is disposed substantially along the optical axis of the outer lens 24. In such embodiments, the center of the bulb 27 is directly behind the center of the outer lens 24 when viewed from the front of the motorcycle 1 (i.e., the bulb 27 is directly behind the end point of line L centered on outer lens 24 as shown in FIG. 4). Thus, the bulb 27 is disposed, relative to the center plane CL, outwardly from the outermost portion 5c of the front fork 5 as shown in FIG. 3.

With reference to FIG. 3, it is seen that since the bulb 27 is directly behind the center of the outer lens 24, the rearward projection 21a is located beyond of the vehicle body 7. Specifically, the rearward projection 21a is disposed near the front fork 5, but is located beyond the outermost portion 5c. Since the rearward projection 21a so disposed, the tapered shape of the more forward portions of the lamp body 21 precludes contact between the lamp body 21 and the fork 5 as it rotates along path R. Thus, disposing the bulb 27 directly behind center of the outer lens 24 allows the headlight 3 to be disposed relatively close to the center plane CL of the motorcycle 1 and in a relatively rearward location. For example, given the position of the headlight 3 shown in FIG. 3, if the bulb 27 were disposed, for instance, directly behind the midpoint C, then the rearward projection 21a would be inward of the outermost portion 5c of the fork 5. In that case, interference with the fork 5 could be avoided only if the entire headlight 3 were repositioned to a less desirable location (e.g., outwardly from the position shown in FIG. 3 or in a more forward direction).

Figure 2:
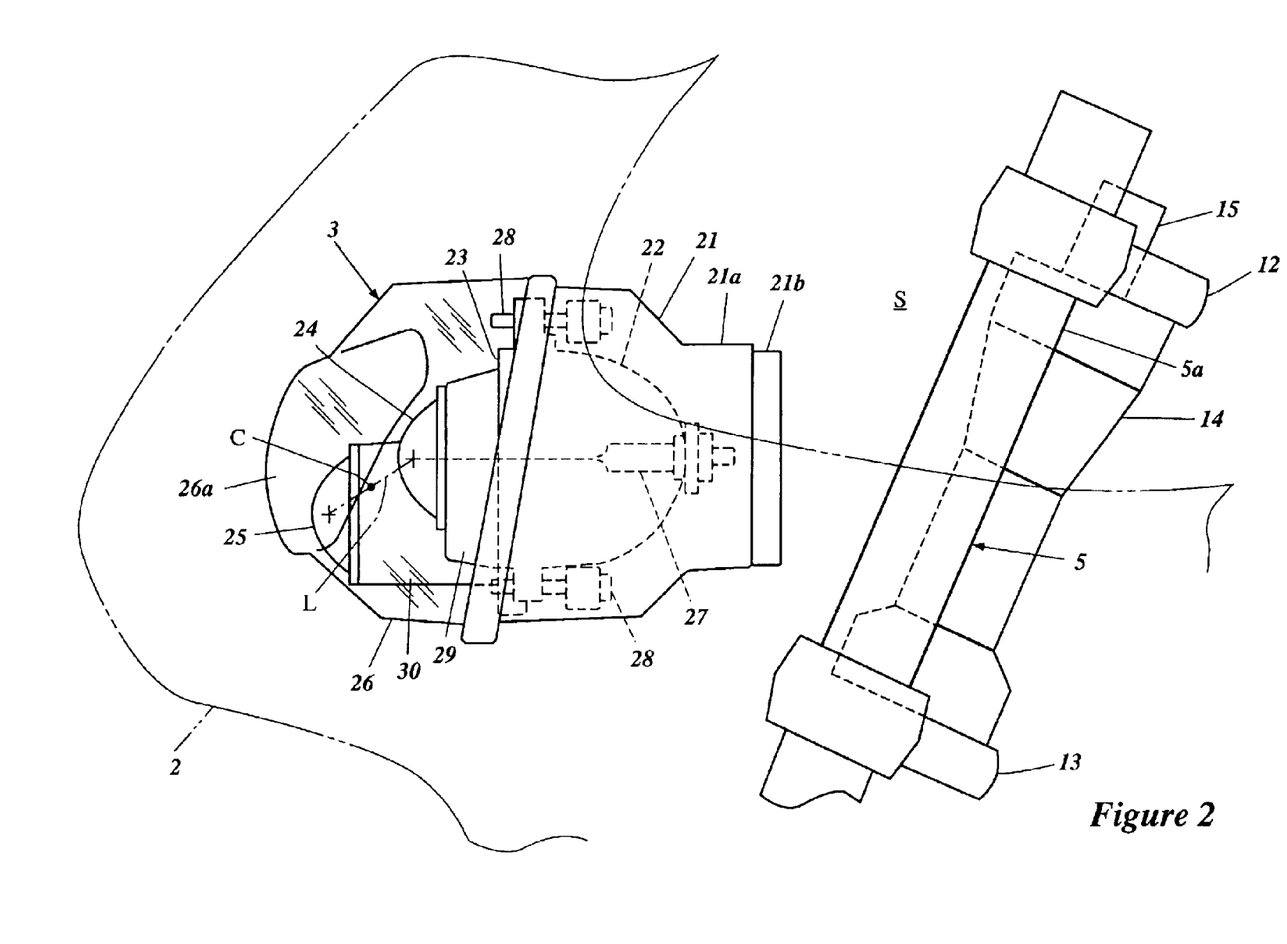
FIG. 2 is a side view of the headlight shown in FIG. 1 illustrating the location of the headlight relative to the fork of the motorcycle.

In the present embodiment, as illustrated using FIG. 2, the outer lens 24 is vertically disposed above of the inner lens 25. As a consequence, the outer lens mounting seat 29, the light source 27, and the rearward projection 21a are vertically disposed above the centroid C and the inner lens 25. In certain embodiments, the light source 27 is disposed substantially along the optical axis of the outer lens 24 and the rearward projection 21a, therefore, is vertically disposed directly behind the center of the upper lens 24. As a consequence, the rearward projection 21a is vertically higher than it would be if lenses 24, 25 were vertically disposed at the same vertical height.

The outer lens 24 preferably is disposed both rearward and above of the inner lens 25. In such an embodiment, the rearward projection 21a is the most rearward portion of the lamp body 21 and, in certain configurations, comes closest to the envelope defined by the plurality of rotational positions of the fork 5. Therefore, since the outer lens 24 is disposed above of the inner lens 25, the headlight 3 may be disposed to a more generally rearward location. This may be seen by first considering that the envelope defined by the plurality of rotational positions of the fork 5 defines a generally cylindrical surface in the space S shown in FIG. 2. Since the front fork 5 is tilted rearwardly, the cylindrical in the space S is also tilted rearward by substantially the same amount. Therefore, as the rearward projection 21a is disposed higher, the rearward projection 21a and, therefore, the entire headlight 3 may be disposed to a more rearward location before intersecting the envelope.

In certain embodiments, the outer lens 24 has an optical axis substantially parallel to the center plane CL and the light source 27 is disposed such that the optical axis of the outer lens 24 is between the center plane CL and the light source 27. In such an embodiment, the headlight 3 may be more favorably disposed, in certain instances, than when the light source 27 is disposed directly behind the outer lens 24.

Generally, an envelope conforming to the front faces of the two lenses 24, 25 determines the shape of lens cover 26. Consequently, headlights consistent with embodiments described herein result in the envelope of the lens cover 26 generally sloping more rearwardly when moving outwardly from the center plane CL. This shape is generally associated with lower air resistance. Thus, the headlight 3 may contribute to improved fuel consumption as a result of reduced air resistance and to a generally more compact design of the front portion of the motorcycle 1.

Figure 6:
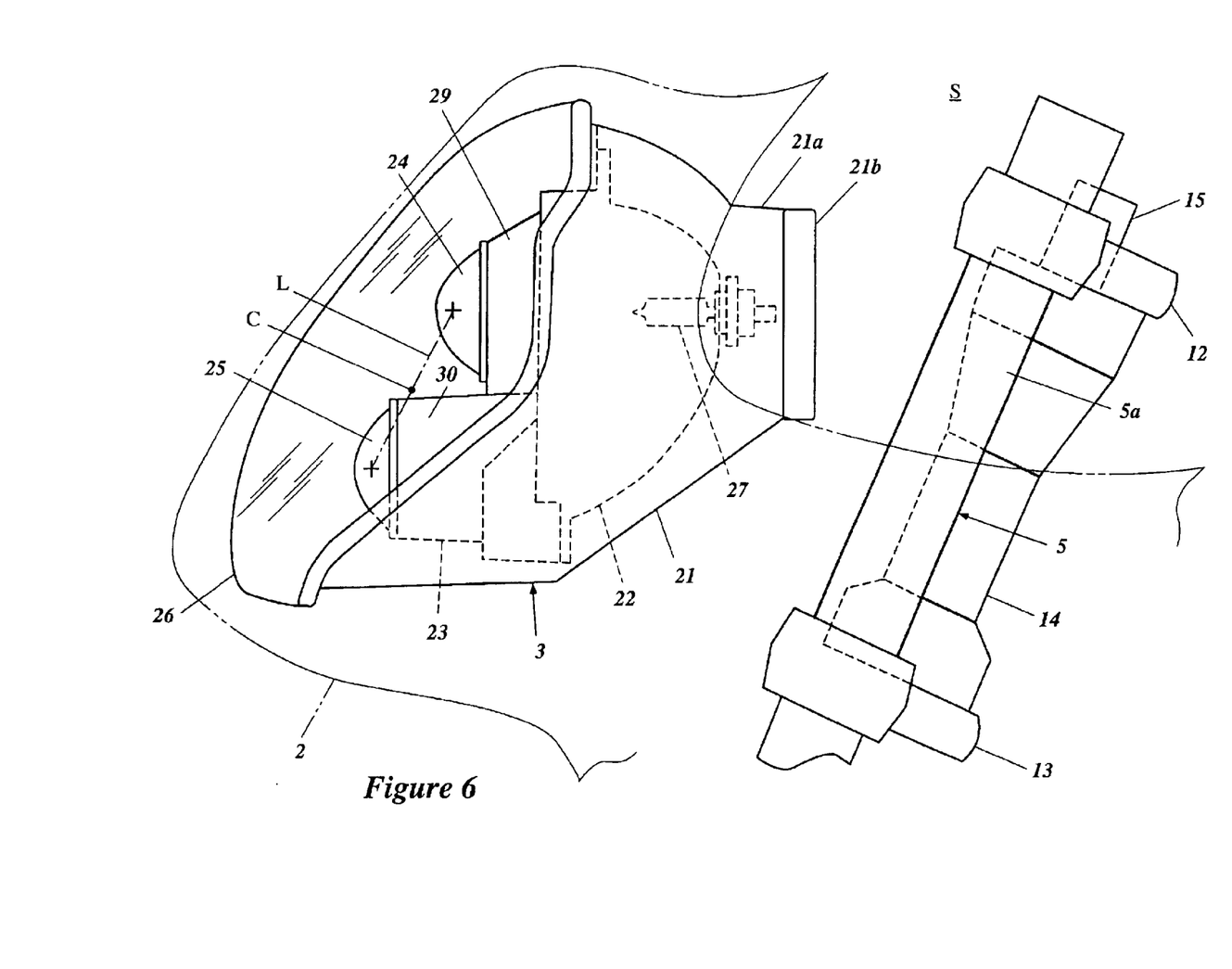
FIG. 6 is a side view of another preferred embodiment of the headlight wherein one of the lenses of the headlight is vertically mounted above another lens of the headlight.
Figure 7:
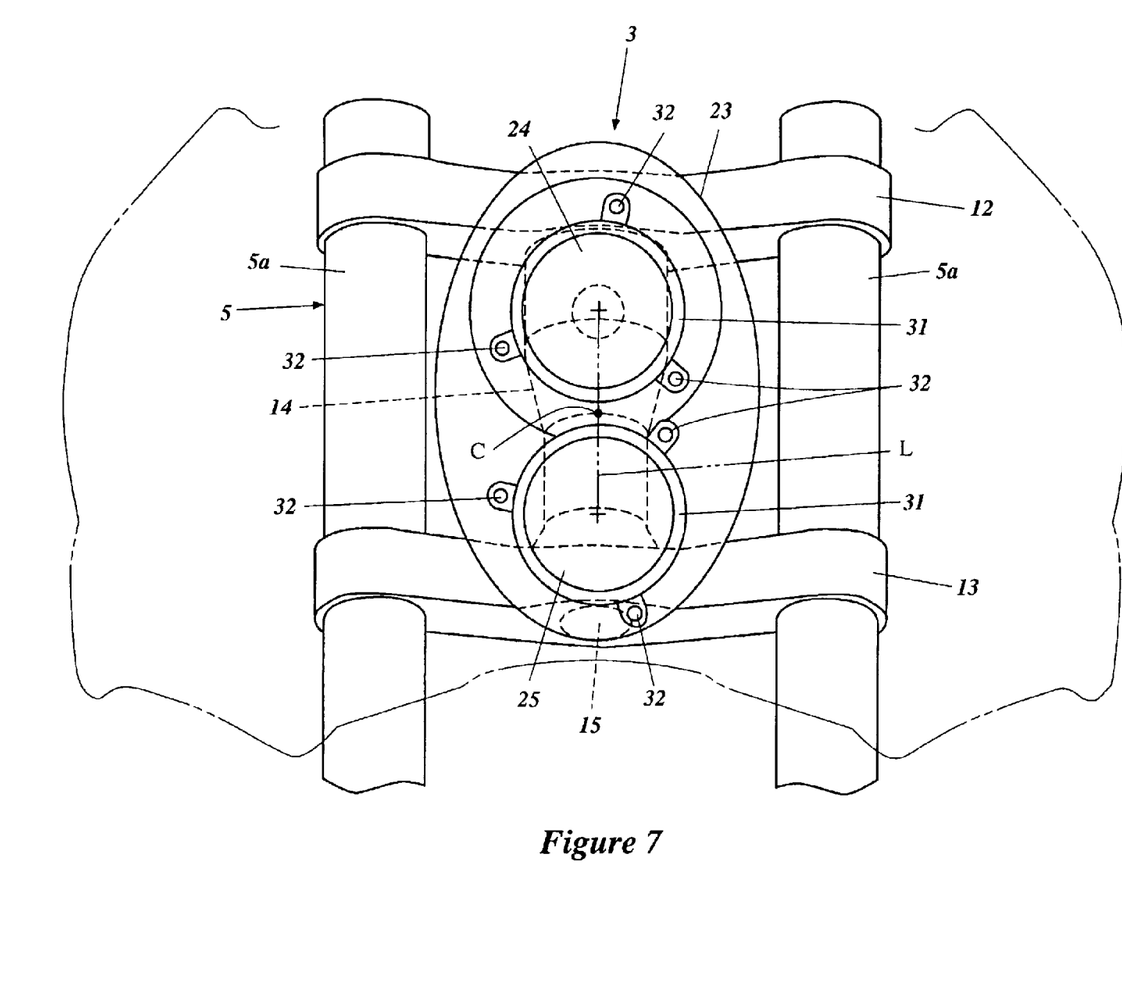
FIG. 7 is a front view of the headlight shown in FIG. 6 wherein the headlight is laterally centered in front of the fork.

In accordance with another embodiment of the headlight, such as that schematically illustrated in FIGS. 6 and 7, the centers of the plurality of lenses 24, 25 are disposed substantially along a vertical line L and the light source 27 is disposed vertically above a centroid C of the centers. Preferably, the vertical line L lies substantially in a vertical plane passing through the center plane CL. In certain embodiments, the plurality of lenses 24, 25 comprises a lower lens 25 and upper lens 24, wherein the lower lens 25 is disposed vertically below the upper lens 24. As illustrated in FIG. 6, the light source 27 is disposed vertically upwardly of the midpoint C of the line L having end points at the centers of the lenses 24, 25 when viewed from the front. Thus, the rearward projection 21a formed at the rear portion of the lamp body 21 is located at higher vertical position relative to the headlight in general. Consequently, the headlight 3 may be favorably disposed in a more rearward position within the space S in FIG. 6 before coming into contact with the front fork 5.

In certain embodiments, the upper lens 24 has an optical axis substantially parallel to the center plane CL and the light source 27 is disposed substantially along the optical axis of the upper lens 24 (i.e., directly behind the center of the lens 24 when viewed from the front). In other embodiments, the light source 27 is disposed such that the optical axis of the upper lens 24 is between the center plane CL and the light source 24. Therefore, the headlight 3 may, in certain instances, be located even more rearward than when light source 27 is more disposed substantially along the optical axis of the upper lens 24, since the steering shaft 15 and the fork 5 are generally more rearward at higher vertical positions.

In certain embodiments, the upper lens 24 is disposed rearward of the lower lens 25. Since the fork 5 is tilted rearwardly, this configuration may, in certain instances, allow the headlight 3 to be located even more rearwardly than when the upper lens 24 is not disposed rearward of the lower lens 25.

In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A headlight for a motorcycle having a fork and a vertical center plane extending along the length of the motorcycle, the headlight comprising:
    a light source; and
    a plurality of lenses having centers and being arranged to receive light from the light source;
    the light source being adapted to be disposed farther outwardly from the center plane than a centroid of the centers of the lenses.

2. The headlight as in claim 1, wherein the plurality of lenses comprises an inner lens disposed closer to the center plane and an outer lens disposed farther from the center plane.

3. The headlight as in claim 2, wherein the outer lens is disposed rearward of the inner lens.

4. The headlight as in claim 2, wherein the outer lens is disposed higher than of the inner lens.

5. The headlight as in claim 2, wherein the outer lens has an optical axis substantially parallel to the center plane, and the light source is disposed substantially along the optical axis of the outer lens.

6. The headlight as in claim 2, wherein the outer lens has an optical axis substantially parallel to the center plane, and the light source is disposed such that the optical axis of the outer lens lies between the center plane and the light source.

7. A headlight system for a motorcycle having a fork and a vertical center plane extending along the length of the motorcycle, the headlight system comprising:
    a first headlight having:
        a first light source;
        a first plurality of lenses having centers and being arranged to receive light from the first light source; and
    a second headlight having:
        a second light source;
        a second plurality of lenses having centers and being arranged to receive light from the second light source;
    wherein the first light source is disposed outwardly from a centroid of the centers of the first plurality of lenses and the second light source is disposed outwardly from a centroid of the centers of the second plurality of lenses, and wherein the first headlight is disposed laterally on one side of the center plane and the second headlight is disposed laterally on the opposite side of the center plane.

8. The headlight as in claim 7, wherein each of the first and second plurality of lenses comprises an inner lens disposed closer to the center plane and an outer lens disposed farther from the center plane.

9. The headlight as in claim 8, wherein the outer lens is disposed rearward of the inner lens.

10. The headlight as in claim 8, wherein the outer lens is disposed higher than the inner lens.

11. The headlight as in claim 8, wherein the outer lens has an optical axis substantially parallel to the center plane, and the light source is disposed substantially along the optical axis of the outer lens.

12. The headlight as in claim 8, wherein the outer lens has an optical axis substantially parallel to the center plane, and the light source is horizontally disposed such that the optical axis of the outer lens is horizontally between the center plane and the light source.

13. A headlight for a motorcycle having a fork and a vertical center plane extending along the length of the motorcycle from fore to aft, the headlight comprising:
    a reflector;
    a light source disposed forward of at least a portion of the reflector; and
    a plurality of lenses having centers and being arranged to receive light from the light source, each lens covering part of said reflector;
    the centers being disposed substantially along a vertical line and the light source being disposed vertically above a centroid of the centers.

14. The headlight as in claim 13, wherein the plurality of lenses comprises a lower lens and upper lens, and the lower lens is disposed vertically below the upper lens.

15. A headlight for a motorcycle having a fork and a vertical center plane extending along the length of the motorcycle, the headlight comprising:
    a light source;
    a plurality of lenses having centers and being arranged to receive light from the light source;
    the centers being disposed substantially along a vertical line and the light source being disposed vertically above a centroid of the centers;
    wherein the plurality of lenses comprises a lower lens and upper lens, and the lower lens is disposed vertically below the upper lens; and wherein the upper lens is disposed rearward of the lower lens.

16. The headlight as in claim 14, wherein the upper lens has an optical axis substantially parallel to the center plane, and the light source is disposed substantially along the optical axis of the upper lens.

17. The headlight as in claim 14, wherein the upper lens has an optical axis substantially parallel to the center plane, and the light source is horizontally disposed such that the optical axis of the upper lens is between the center plane and the light source.

18. A motorcycle comprising a frame generally bisected by a vertical, longitudinally extending center plane, a front fork rotatably coupled to the frame so as to rotate about a steering axis through an envelop of rotational positions, and at least one headlight being coupled to the frame and being disposed outside the envelop of rotational positions of the front fork so as not to interfere with rotation of the front fork, the headlight including a light source and a plurality of lenses arranged to receive light from the light source, each lens having a center that is spaced from the center of the another lens, a centroid being defined at the midpoint between the centers of two adjacent lenses, and the light source being disposed farther outwardly from the center plane than the centroid.

19. The motor cycle as in claim 18, wherein the plurality of lenses comprise an inner lens disposed closer to the center plane and an outer lens disposed farther from the center plane, the outer lens has an optical axis substantially parallel to the center plane, and the light source is disposed substantially along the optical axis of the outer lens.

20. The headlight as in claim 18, wherein the plurality of lenses comprise an inner lens disposed closer to the center plane and an outer lens disposed farther from the center plane, the outer lens has an optical axis substantially parallel to the center plane, and the light source is disposed such that the optical axis of the outer lens lies between the center plane and the light source.

* * * * *

UNITED STATES PATENT AND TRADEMARK OFFICE
CERTIFICATE OF CORRECTION

PATENT NO.    : 6,799,872 B2
DATED         : October 5, 2004
INVENTOR(S)   : Hidenari Kawai It is certified that error appears in the above-identified patent and that said Letters Patent is hereby corrected as shown below:

Column 7,
Line 59, after "than" please delete "of".

Signed and Sealed this

Twenty-seventh Day of December, 2005

JON W. DUDAS
*Director of the United States Patent and Trademark Office*